(12) United States Patent
Steinbiss et al.

(10) Patent No.: US 7,050,550 B2
(45) Date of Patent: May 23, 2006

(54) METHOD FOR THE TRAINING OR ADAPTATION OF A SPEECH RECOGNITION DEVICE

(75) Inventors: Volker Steinbiss, Aachen (DE); Thomas Eisele, Roetgen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/143,641

(22) Filed: May 10, 2002

(65) Prior Publication Data

US 2003/0012347 A1    Jan. 16, 2003

(30) Foreign Application Priority Data

May 11, 2001   (DE)   ............................. 101 22 828

(51) Int. Cl.
*H04M 1/64* (2006.01)
(52) U.S. Cl. ............................. 379/88.01; 379/88.02; 704/246
(58) Field of Classification Search ............. 379/88.03, 379/88.01, 88.04, 355.01, 88.16; 455/563, 455/564, 569.1; 704/200, 231, 246, 247, 704/270, 275, 258
See application file for complete search history.

(56) References Cited

U.S. PATENT DOCUMENTS 5,802,149 A * 9/1998 Hanson .................... 379/88.03
5,805,672 A 9/1998 Barkat et al. ............. 379/88.03
6,260,012 B1 * 7/2001 Park ......................... 379/88.03
6,314,166 B1 * 11/2001 Laurila et al. ........... 379/88.03

FOREIGN PATENT DOCUMENTS

WO    WO0014729    3/2000

* cited by examiner

*Primary Examiner*—Ovidio Escalante
(74) *Attorney, Agent, or Firm*—Michael E. Belk

(57) ABSTRACT

The invention relates to a method for the training or adaptation of a speech recognition device used to act upon functions of an electrical appliance, for example the triggering of a voice dial in a mobile telephone terminal. In order to structure the training and/or adaptation of the speech recognition device to improve user comfort, a method is proposed with the following steps:

performance of a speech input;
  processing of the speech input by means of the speech recognition device for the production of a speech recognition result;
  if the speech recognition result can be allocated to a function of the electrical appliance, action upon the allocatable function of the electrical appliance;
  training or adaptation of the speech recognition device on the basis of the speech recognition result associated with the speech input made, if the action upon the allocatable function of the electrical appliance does not cause a user input expressing rejection.

17 Claims, 5 Drawing Sheets

METHOD FOR THE TRAINING OR ADAPTATION OF A SPEECH RECOGNITION DEVICE

The invention relates to a method for the training or adaptation of a speech recognition device which is used to act upon functions of an electrical appliance.

Notably, the electrical appliance is a mobile telephone, in which the performance of voice dial corresponds to device functions being acted upon, in which another subscriber is dialed by a speech input. When used in a motor vehicle in which a hands-free set is generally provided to assist the user further, the user's operating comfort is improved since he no longer has to perform a keypad input to trigger the dialing of another subscriber. Other areas of application include the control of electronic consumer appliances such as television sets, video recorders, hi-fi music systems, kitchen appliances or other appliances with speech control, in which the various appliance functions can be acted upon by means of speech, e.g. volume control, the choice of a television channel or radio station or the adjusting of the motor speed of a kitchen appliance.

A speech recognition device can be trained and/or adapted, for which acoustic models and associated parameters are adapted to new words, the user and if necessary to ambient noise or the relevant microphone position. Here, either new entries are added to the lexicon of the speech recognition device that contains the vocabulary of the speech recognition device represented by acoustic models, or existing vocabulary entries are adapted. In speech recognition devices that use Hidden Markov models (HMM), transition probabilities and output distributions of Hidden Markov models are adjusted.

During the training, the speech recognition device is adapted to the speech inputs of a user who has not yet operated the device. This can take place before the first use of the speech recognition device by a user or even later after first use for speech inputs not yet been activated. It is also possible for re-training to be carried out using older speech data. Different variants for the performance of training are known in which, for example, an estimation of distribution mixes takes place in fixed HMM-topology or also an alteration of the number or switching of the HMM states.

In one adaptation of the speech recognition device, preset parameters of the speech recognition device are adapted and optimized, in which the parameters have been preset in training performed by a user or where applicable also on the basis of adaptation processes already performed; however, the parameters can also be preset independently of a user. In acoustic adaptation to the user, a system is improved by means of collected speech data specific to this user, i.e. the error rate should become lower in the course of the adaptation. A large number of adaptation methods are known, e.g. MAP (maximum a posteriori), MLLR (maximum likelihood linear regression), own voices (this method is currently only used in complex structured systems). Also forms of the adaptation other than the acoustic adaptation are possible; thus, improvements can be made in the performance of a system and analysis of these data, for example by establishing usage statistics (e.g. by assessing how often a command or telephone number is spoken, and in what combinations they are spoken).

U.S. Pat. No. 5,805,672 discloses the provision of a voice dial function for a mobile telephone device in a motor vehicle, by means of a supplementary device with a speech recognition device. When used in the motor vehicle, a hands-free set is used. If voice dial is required, the voice dial mode must first be activated. The supplementary device then recognizes, by means of the speech recognition device, learned words in a speech input and allocates an associated telephone number to a recognized word, and the subscriber relate toed is automatically dialed. A training mode is provided, through the activation of which the speech recognition device can be trained. The training mode is activated by key depression. During training, a user is asked to say a name twice and input the associated telephone number. Then the user depresses a confirmation key, after which the system outputs to the user the speech recognition result (the recognized name) and the associated telephone number by speech output. The user can then continue the training with another name.

WO 00/14729 discloses a mobile telephone device with a speech recognition device and voice dial function. Here too a training mode is provided which is activated by the operation of a switch. During the training mode, a conventional training operation is carried out, in which the vocabulary of the speech recognition device is expanded by the inputting of new words.

The invention is based on the object of designing the training and/or adaptation of the speech recognition device to increase user comfort.

The object is achieved in the method described initially through the following steps:
  performance of a speech input;
  processing of the speech input by means of the speech recognition device to produce a speech recognition result;
  if the speech recognition result can be allocated to a function of the electrical appliance, action upon the allocatable function of the electrical appliance;
  training or adaptation of the speech recognition device on the basis of the speech recognition result associated with the speech input made, if the action upon the allocatable function of the electrical appliance does not lead to a user input causing rejection.

The training or adaptation by means of the method according to the invention does not require any activation of a training or adaptation mode. Even the confirmation of user inputs before use for the training or adaptation is not necessary. The suitability of a speech input and of an associated speech recognition result for the training or adaptation is rather established by the fact that, on the basis of the speech recognition result, an allocatable device function is activated e.g. by the performance of a voice dial process, and if then the user does not give an input with which he expresses his rejection e.g. by stopping the execution of the device function (Claim 2), it is assumed that the speech recognition result represents the speech input correctly and can be used for training or adaptation. For example, the user can also express his rejection through speech or keypad input.

Claim 3 relates to an additional security measure before a speech recognition result is used for the training or adaptation, with the result that, in cases where the user does not express his rejection, although the speech recognition result does not represent the speech input correctly, a training operation or adaptation is not carried out on the basis of this speech recognition result. This security measure is designed to protect cases where the user is just distracted and thus does not express his rejection, although the speech recognition result is unsatisfactory, nor does the intended action upon a device function take place.

Claim 4 relates to cases where the security measure described in Claim 3 prevents training or adaptation on the basis of an unsatisfactory reliability grade. If, directly after the speech input an input is made by means of another input method e.g. through keypad input, there is a high probability that the preceding speech input and the entry made by means of the other input method will concur. In order to assess this congruence, a reliability grade is also established with a view to detecting cases where the speech input and the following input made by means of the other method do not concur. If this reliability grade falls within a predetermined target range, a training operation or adaptation is carried out taking into account the speech recognition result and the input made by means of the other input method.

Claim 5, like Claim 4, relates to cases where a speech input is initially not considered suitable for the training or adaptation, but then the next input is made by means of another input method so that again there is a high probability that the input made by means of the other input method and the preceding speech input concur. In contrast to Claim 4, Claim 5 incorporates cases where, following a speech input, the user makes an input expressing his rejection with the result that, for this reason, no training or adaptation takes place initially. Here too before the training or adaptation following the input made by means of the other input method, an assessment is conducted using a reliability grade with a view to detecting cases where the speech input and the following input made by means of the other input method do not concur.

In the embodiment as claimed in Claim 6, at least one alternative speech recognition result for each speech recognition result is produced. If, on the basis of the latest speech input and an associated speech recognition result, a training operation or adaptation is carried out, if the speech input before last has not led to any training or adaptation, it is also checked whether the speech recognition result corresponds to the latest speech input of an alternative speech recognition result for the speech input before last. If this is the case, it is assumed that the speech input before last and the latest speech input correspond to each other. In a subsequent additional training operation or subsequent additional adaptation, parameters of the speech recognition device are set in such a way that both the speech input before last and the latest speech input would lead to the correct speech recognition result in a fresh input operation, i.e. to the speech recognition result that was ascertained for the latest speech input.

In the embodiment as claimed in Claim 7, a user is informed of a speech recognition result acoustically or visually. Thus, in the evaluation of the accuracy of a recognition result, the user is not merely referred to the recognition of the performance of a device function. The additional information is needed by the user when the performance of a device function is not recognizable to the user, or he is only given inadequate information relate toing the speech recognition result produced by the speech recognition device.

Claims 8 and 9 relate to the application of the invention in a mobile telephone. Here, the speech recognition device is used in particular for voice dialing.

Claim 10 relates to an electrical appliance for the performance of the method according to the invention. In Claim 11, the electrical appliance takes the form of mobile telephone terminal.

The invention will be further described with reference to examples of embodiments shown in the drawings to which, however, the invention is not restricted.

Figure 1:
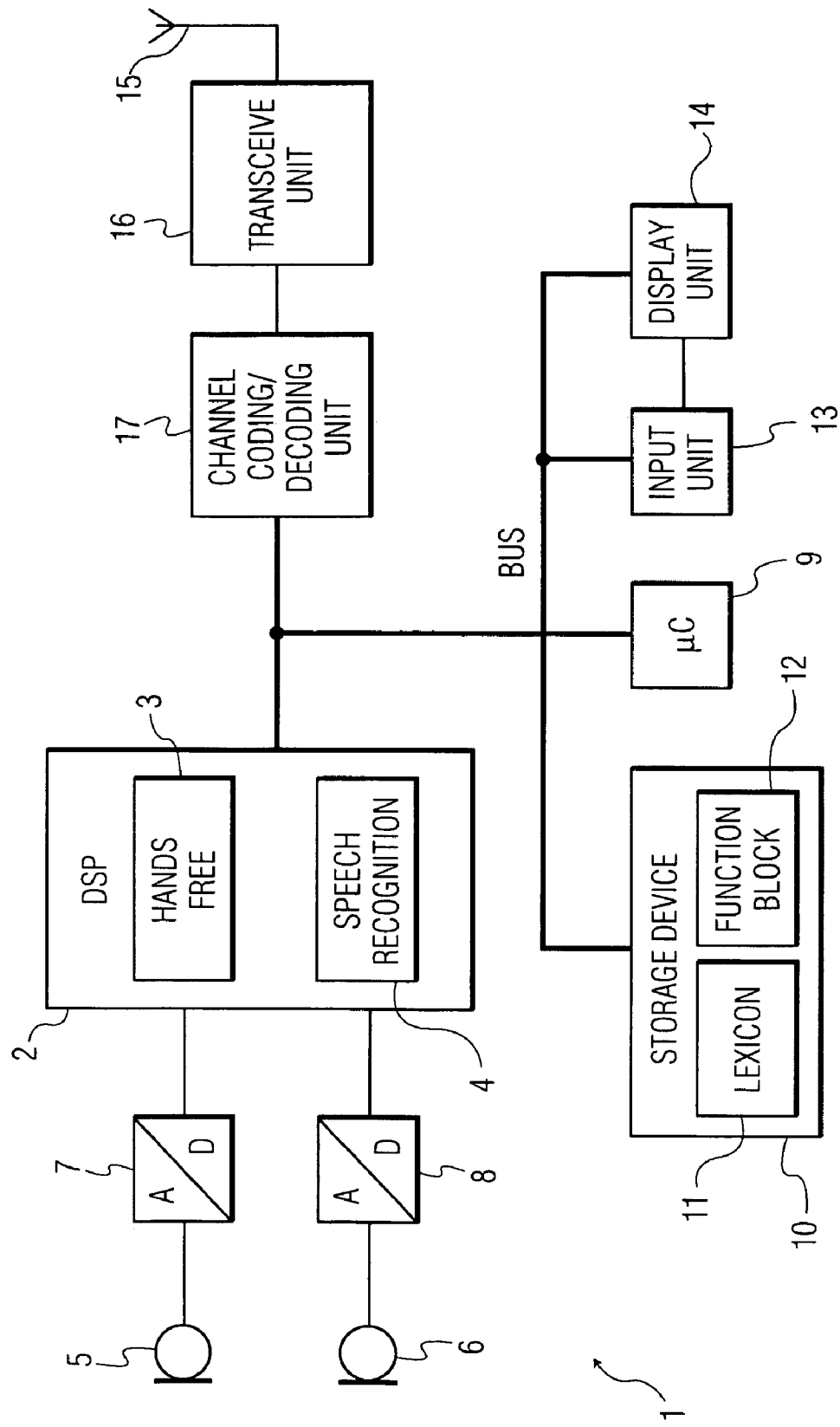
FIG. 1 shows a block circuit diagram of a mobile telephone terminal.

FIG. 1 shows an electrical appliance 1 formed as a mobile telephone terminal with a digital signal processor 2, which is assembled firstly for speech coding/decoding and for hands-free signal processing (combined by a function block 3) and secondly for the performance of speech recognition procedures of a speech recognition device (function block 4). The mobile telephone terminal 1 has a microphone 5 and a loudspeaker 6 which, via analog-digital converters 7 and 8, are connected to the digital signal processor 2. The mobile telephone terminal 1 also contains a micro-controller 9 for the central control of the functions of the mobile telephone terminal 1. Moreover, a storage device 10 is provided that serves for the storage of a lexicon 11 for the speech recognition device 4 and other data 12, where the other data are combined for simplification by the function block 12 since they are not essential to the invention. The lexicon 11 contains the vocabulary of the speech recognition device 4 in the form of acoustic models produced as Hidden Markov models; the lexicon 11 must be regarded as a part of the speech recognition device 4. The mobile telephone terminal 1 also contains a keypad input unit 13 and a display unit 14. Via an antenna 15, high-frequency signals are received and emitted which are processed by a transceiver unit 16. A channel coding/decoding unit 17 is used for the channel coding of signals to be transmitted or the channel decoding of signals received. A bus system 18 connects the digital signal processor 2, the micro-controller 9, the storage device 10, the keypad input unit 13, the display unit 14 and the channel coding/decoding unit 17.

By means of the speech recognition device 4 it is possible, by speech inputs given via the microphone 5, to act upon functions of the mobile telephone terminal 1. In the above case for example, by means of a speech input, the dialing up of another subscriber is triggered (voice dialing). In this process, a user says either the telephone number of the other subscriber who is to be called, or he says the name of the other subscriber whose associated telephone number must then have been previously allocated to the name, for which allocation either speech input alone or keypad input alone via the keypad input unit 13, or both keypad input and speech input can be used. In order to guarantee the smooth functioning of the speech recognition device 4, training of the speech recognition device 4 is necessary, i.e. a vocabulary adapted to the application in question and stored in the lexicon 11 must be built up. Also, the later adaptation of acoustic models of the speech recognition device 4 that have already been trained is provided with a view to adapting the speech recognition device to altered application conditions.

FIGS. 2 to 5 show various embodiments for the training or adaptation of the speech recognition device 4.

Figure 2:
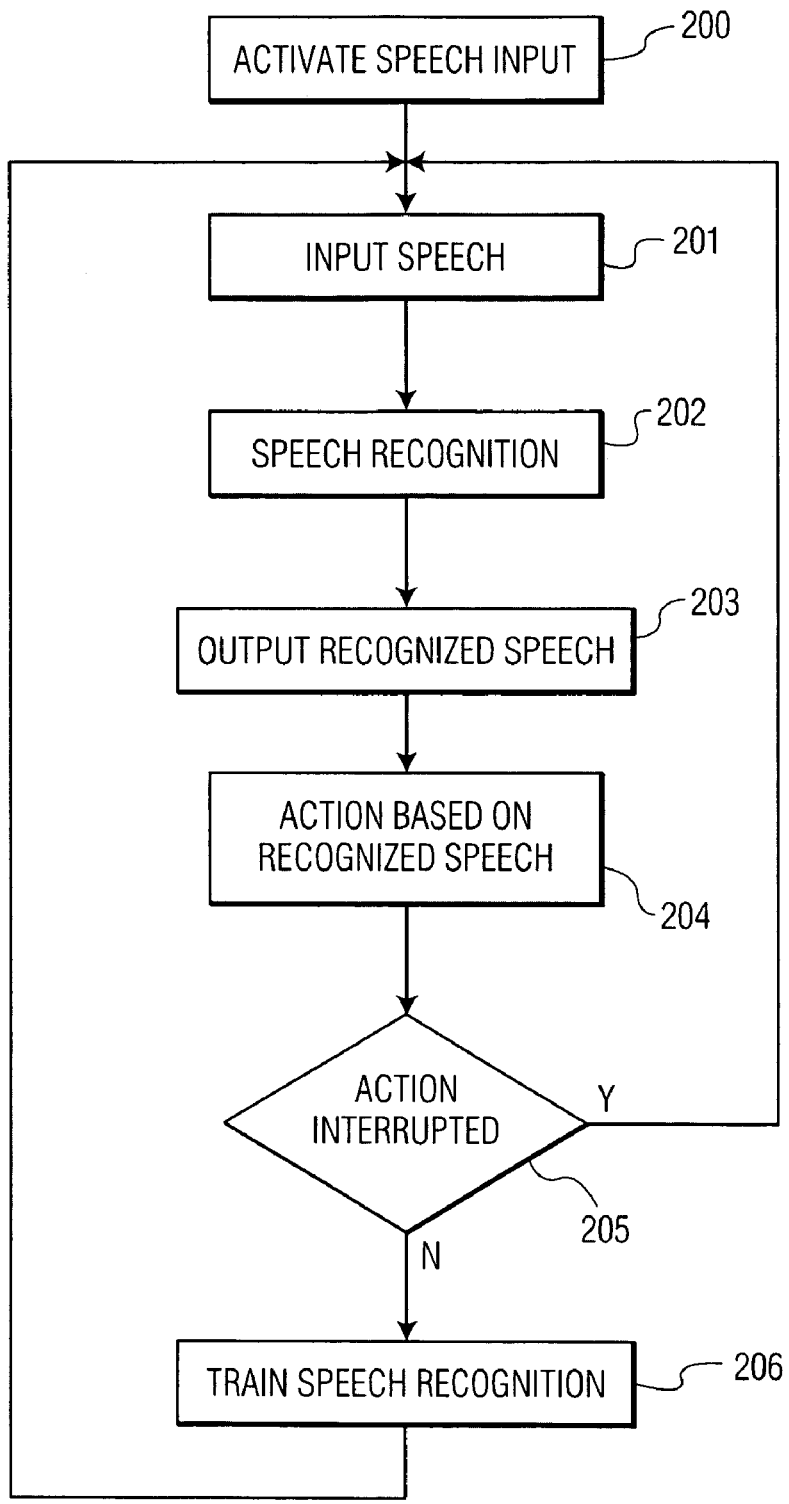
FIGS. 2 to 5 show flow charts of different variants of the invention.

In the arrangement shown in FIG. 2 first in a step 200 the speech input mode is activated e.g. through the pressing of a relevant activation button. In a step 201, the user makes a speech input for which he enters the name of another subscriber whom he intends to call. In step 202, with the help of the speech recognition device 4, an automatic speech recognition operation is carried out and a speech recognition result is produced. This speech recognition result is output to the user in step 203, e.g. through visual output via display unit 14 or by means of an acoustic output via the loud speaker 6. Assuming that a telephone number has already been allocated to the recognized name, in step 204, automatic dialing of this telephone number is now conducted. In step 205 an inquiry is made as to whether the automatic dialing is interrupted by the user (e.g. by pressing a particular button or speaking a stop voice command at the instances at which the user recognizes a wrong speech recognition result and rejects it), a jump is made back to the point between step 200 and step 201 where the device is ready to receive a further speech input. If the automatic dialing is not interrupted and, in step 205 a negative answer is given to the inquiry, the training or adaptation of the speech recognition device 4 takes place on the basis of the speech recognition result ascertained in step 202. Then a jump is made back to the point between steps 200 and 201, with the result that a further speech input can be made.

Figure 3:
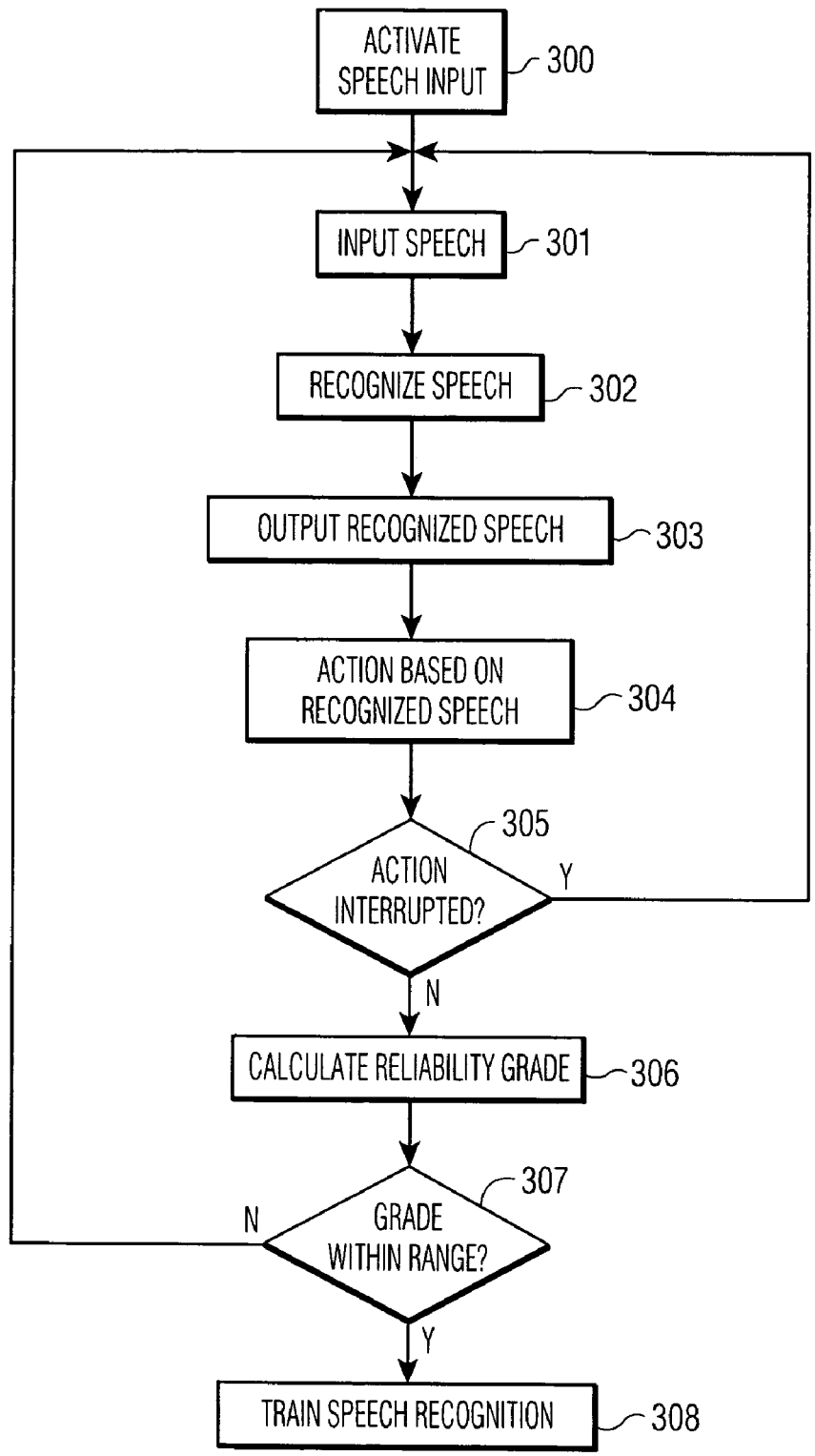

In the embodiment according to FIG. 3, initially in a step 300 the speech input mode of the mobile telephone terminal 1 is activated. After that in step 301 a speech input is made i.e. in the case in question, a name is spoken. After a speech recognition operation has been carried out in step 302, in step 303 the speech recognition result is reproduced for the user acoustically or visually. Then, as has already been shown in FIG. 2, the automatic dialing of a subscriber with the recognized name is triggered. In step 305, an inquiry is made as to whether the automatic dialing is interrupted by the user. If this is the case, a jump is made back to the point between steps 300 and 301, because it must then be assumed that the user has recognized the speech recognition result as wrong and rejected it. If the automatic dialing is not interrupted, in step 306 the calculation of a reliability grade for the speech recognition result is made. In step 307, the inquiry is then made as to whether the reliability grade falls within a predetermined target range. It this is not the case, a jump is made back to the point between steps 300 and 301. If the reliability grade falls within the prescribed target range, it must be assumed that the speech recognition result actually represents the speech input correctly and in step 308 a training operation or adaptation is carried out on the basis of this speech recognition result.

Figure 4:
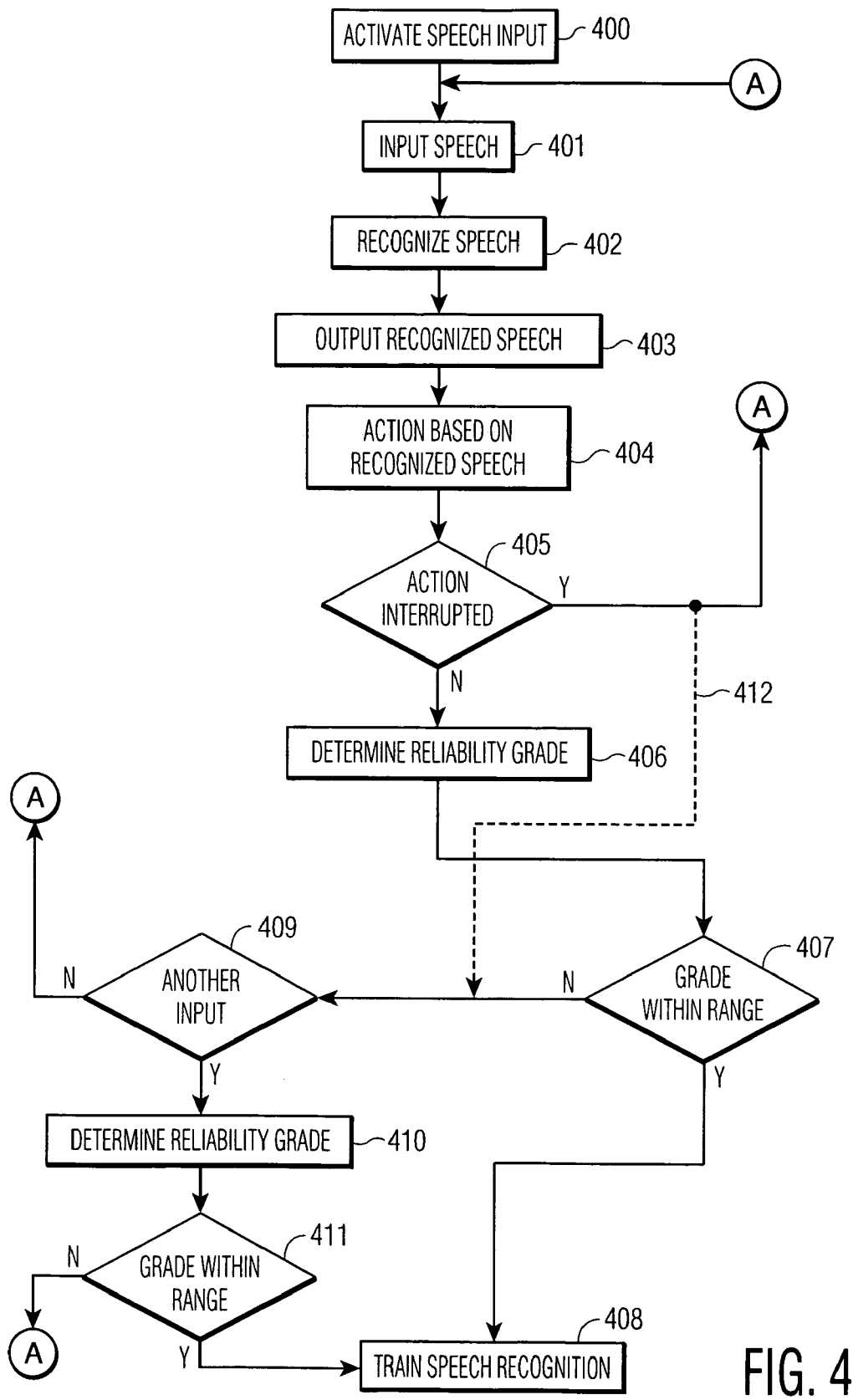

In the embodiment variant according to FIG. 4, in a step 400 first the speech input mode is activated. Then in step 401 a speech input is made i.e. the name of a subscriber who is to be called is spoken. In step 402, a speech recognition operation with regard to the speech input that has been made is conducted. The speech recognition result is output to the user acoustically or visually in step 403. In step 404, the automatic dialing of a subscriber with the recognized name is triggered. In step 405, a check is conducted as to whether the dialing is interrupted by the user. If this is the case, i.e. if the speech recognition result is recognized by the user as wrong, a jump is made back to the point between steps 400 and 401. If the automatic dialing is not interrupted by the user, an initial reliability grade is determined for the speech recognition result in step 406. In an inquiry in step 407, it is established whether this initial reliability grade falls within an initial prescribed target range. If this is the case, in a step 408, the training or adaptation of speech recognition device 4 is carried out on the basis of the speech recognition result. If in step 407 it is established that the initial reliability grade does not fall within the initial target range, in step 409 a check is conducted as to whether the subsequent input is made by means of another input method, e.g. through keypad input. If this is not the case, again a jump is then made back to the point between steps 400 and 401. If in step 409 however it is established that the input following directly afterwards is made by means of another input method—i.e. in particular via keypad input—the probability is great that the previous speech input and the subsequent input by means of the other input method correspond to each other, i.e. the user tries, after a failed voice dial, to trigger dialing of the same subscriber through input by means of the other input method. Following input by means of the other method, in step 410 a second reliability grade is determined for the previous speech recognition result, taking into account the input made by means of the other input method. In step 411 a check is conducted as to whether the second reliability grade falls within a second prescribed target range. If this is the case, with step 408 the training or adaptation of the speech recognition device is carried out on the basis of the speech recognition result, taking into account the user input made by means of the other input method. If it is established in step 411 that the second reliability grade does not fall within the second prescribed target range, this corresponds to acceptance that the input made by means of the other input method and the previous speech input do not correspond to each other, and a jump is made back to the point between steps 400 and 401.

In principle, even in cases where it is established in step 405 that the user interrupts the dialing of a subscriber and thus expresses rejection of the speech recognition result, instead of a jump back to the point between steps 400 and 401, it is possible to proceed with the inquiry in step 409, as is indicated by the jump 412 represented by a dotted line. Thus if an input is made immediately afterwards by means of another input method, again it can be assumed with a high degree of probability that input made by means of the other input method and the preceding speech input correspond to each other, and the speech recognition result does not represent the speech input correctly. Nevertheless, the speech recognition result, even if it is not absolutely correct, can be used for the training or adaptation of the speech recognition device if there is an adequate similarity to the speech input and/or the input made by means of the other input method, which is estimated by means of the check conducted on the basis of a reliability grade. The training operation thus includes both the information contained in the speech recognition result and also that contained in the input made by means of the other input method.

Figure 5:
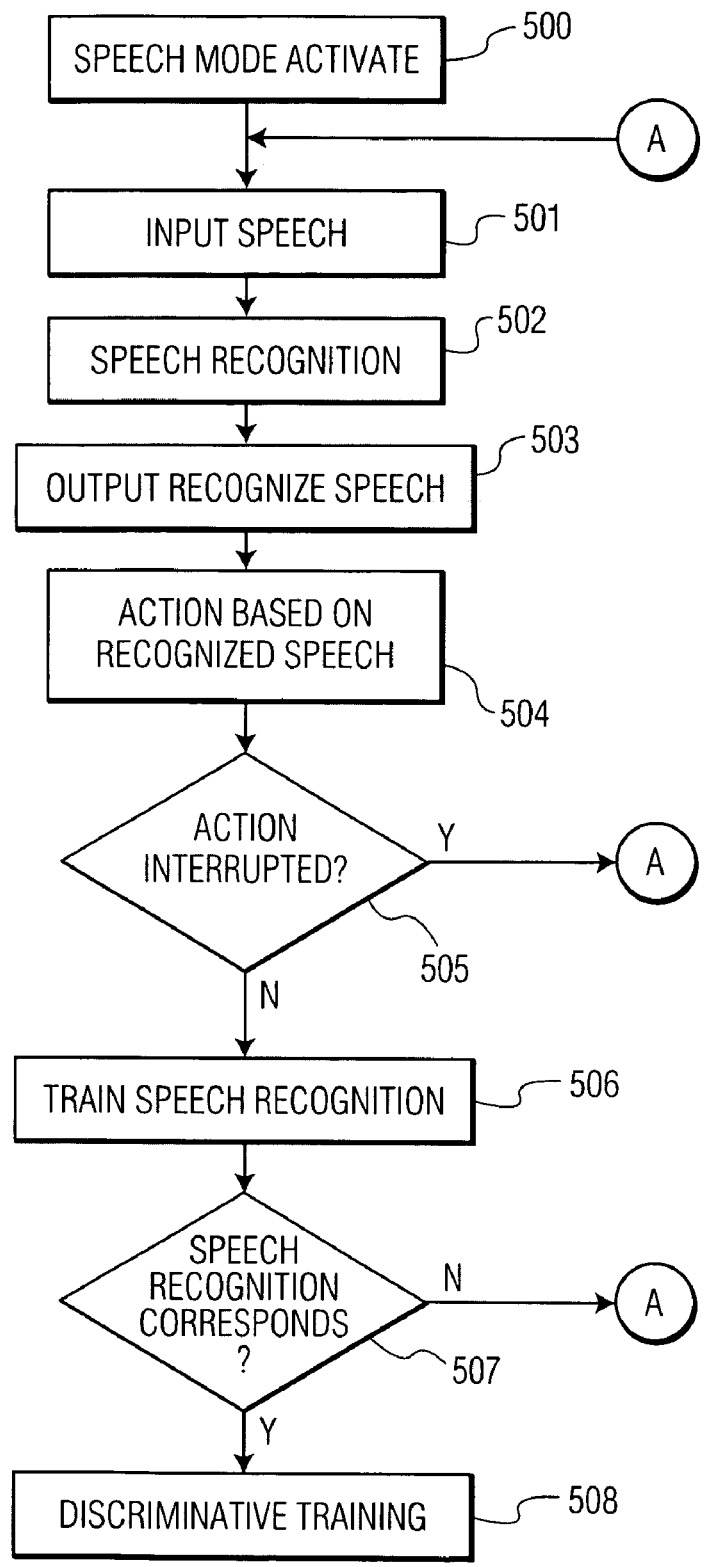

Finally, FIG. 5 shows an invention variant in which discriminative training or adaptation is applied. In a step 500 the speech input mode is activated, in step 501 a speech input is made i.e. here a name is spoken, and in a step 502 a speech recognition operation is carried out by means of the speech recognition device 4, in which at least one further speech recognition result alternative is produced in addition to the speech recognition result. In a step 503, the speech recognition result is output for the user acoustically or visually. In a step 504, with regard to the speech recognition result, the automatic dialing of a subscriber with the recognized name is performed. In a step 505, a check is conducted as to whether the dialing is interrupted by the user. If this is the case, a jump is made back to the point between steps 500 and 501. If this is not the case, in step 506, the training or adaptation of the speech recognition device 4 is carried out on the basis of this latest speech recognition result. In an inquiry step 507, a further check is then conducted as to whether this latest speech recognition result corresponds to a speech recognition result alternative determined for the speech input before last, and whether the speech input before last has led to the stopping of the automatic dialing by the user. If one of the conditions is not met, a jump is made back to the point between steps 500 and 501. If both conditions are met, it is assumed that said speech recognition alternative to the speech input before last actually represents the correct speech recognition result for the speech input before last. In this case in step 508 discriminative training or discriminative adaptation is carried out, provided that the latest speech input and the one before last represent the same word or the same word sequence. The acoustic models associated with the corresponding vocabulary input in the lexicon 11 are adapted in such a way that the speech recognition device 4 would produce the correct speech recognition result both for the latest speech input and for the one before last. After step 508 has been carried out, again a jump is made back to the point between steps 500 and 501.

The invention is restricted neither to application in a mobile telephone terminal, nor to voice dialing. By means of speech input an action can also be achieved upon other functions of an electrical appliance, e.g. on the volume setting of speech outputs. Also, it is not absolutely necessary for the acoustic or visual output of a speech recognition to be made for the user, in particular if the user can conclude from the performance of a device function corresponding to a speech input, without any further information, the accuracy of the speech recognition result. Moreover, the user can also express his rejection, additionally or alternatively, through preset inputs (e.g. preset speech or keypad inputs) which do not interrupt a device function that has been initiated.

The invention claimed is:

1. A method for the training or adaptation of a speech recognition device which is used to act upon functions of an electrical appliance, in which the following steps are provided:

performance of a speech input;

processing of the speech input by means of the speech recognition device;

producing a speech recognition result;

if the speech recognition result can be allocated to a function of the electrical appliance, action upon the allocatable function of the electrical appliance;

training or adaptation of the speech recognition device on the basis of the speech recognition result associated with the speech input made, if the action upon the allocatable function of the electrical appliance does not cause a user input expressing rejection, characterized in that, if after a speech input a user input is made expressing the rejection of a speech recognition result and if, subsequently, a user input is made by means of another input method, it is provided that, taking into account the input made by means of the other input method, a reliability grade for the speech recognition result is determined and a training operation or adaptation of the speech recognition device performed, provided that the speech input and the user input made by means of the other input method represent the same word or word sequence.

2. A method as claimed in claim 1, characterized in that the training or adaptation of the speech recognition device takes place if the performance of the function of the electrical appliance is not interrupted by a user input.

3. A method as claimed in claim 1, characterized in that, for a speech recognition result of the speech recognition device, a reliability grade is determined, and that a training or adaptation of the speech recognition device is carried out on the basis of the speech recognition result corresponding to the speech input made if the reliability grade of the speech recognition result falls within a prescribed target range.

4. A method as claimed in claim 1, characterized in that, for a speech recognition result of the speech recognition device, an initial reliability grade is determined, in that the training or adaptation of the speech recognition device is performed on the basis of the speech recognition result corresponding to the speech input made if the initial reliability grade of the speech recognition result falls within a prescribed initial target range, in that if the initial reliability grade does not fall within the initial target range and also if the subsequent user input is made by means of another input method, it is provided that, taking into account the input made by means of the other input method, a second reliability grade for the speech recognition result is determined and a training operation or adaptation is performed on the basis of the speech recognition result taking into account the user input made by means of the other input method if the second reliability grade falls within a second prescribed target range.

5. A method as claimed in claim 1, characterized in that the speech recognition device also supplies in each case at least one speech recognition result alternative, in that the training or adaptation of the speech recognition device is carried out on the basis of the speech recognition result associated with the latest speech input, if the action upon the function of the electrical appliance allocatable to the speech recognition result does not cause a user input expressing rejection of the speech recognition result, and if the speech recognition result corresponds to a speech recognition result alternative to the speech input before last and a user input expressing rejection of the speech recognition result before last is made, a further training operation or further adaptation of the speech recognition device takes place provided that the latest speech recognition result and the one before last represent the same word or the same word sequence.

6. A method as claimed in claim 1, characterized in that an acoustic or visual reproduction of a speech recognition result is provided.

7. A method as claimed in claim 1, characterized in that the electrical appliance is a mobile telephone.

8. A method as claimed in claim 7, characterized in that, by means of a speech input, a dialing process is triggered.

9. An electrical appliance with a speech recognition device, used to act upon functions of the electrical appliance, in which the electrical appliance and the speech recognition device are designed in such a way that the following steps are used for the training or adaptation of the speech recognition device:

performance of a speech input;

processing of the speech input by means of the speech recognition device;

producing a speech recognition result;

if the speech recognition result can be allocated to a function of the electrical appliance, action upon the allocatable function of the electrical appliance;

training or adaptation of the speech recognition device on the basis of the speech recognition result associated with the speech input made, if the action upon the allocatable function of the electrical appliance does not cause a user input expressing rejection,;

characterized in that, if after a speech input a user input is made expressing the rejection of a speech recognition result and if subsequently, a user input is made by means of another input method, it is provided that, taking into account the input made by means of the other input method, a reliability grade for the speech recognition result is determined and a training operation or adaptation of the speech recognition device performed, provided that the speech input and the user input trade by means of the other input method represent the same word or word sequence.

10. An electrical appliance as claimed in claim 9, characterized in that, for a speech recognition result of the speech recognition device, a reliability grade is determined, and that a training or adaptation of the speech recognition device is carried out on the basis of the speech recognition result corresponding to the speech input made if the reliability grade of the speech recognition result falls within a prescribed target range.

11. An electrical appliance as claimed in claim 9, characterized in that, for a speech recognition result of the speech recognition device, an initial reliability grade is determined, in that the training or adaptation of the speech recognition device is performed on the basis of the speech recognition result corresponding to the speech input made if the initial reliability grade of the speech recognition result falls within a prescribed initial target range, in that if the initial reliability grade does not fall within the initial target range and also if the subsequent user input is made by means of another input method, it is provided that, taking into account the input made by means of the other input method, a second reliability grade for the speech recognition result is determined and a training operation or adaptation is performed on the basis of the speech recognition result taking into account the user input made by means of the other input method if the second reliability grade falls within a second prescribed target range.

12. An electrical appliance as claimed in claim 9, characterized in that the speech recognition device also supplies in each case at least one speech recognition result alternative, in that the training or adaptation of the speech recognition device is carried out on the basis of the speech recognition result associated with the latest speech input, if the action upon the function of the electrical appliance allocatable to the speech recognition result does not cause a user input expressing rejection of the speech recognition result, and if the speech recognition result corresponds to a speech recognition result alternative to the speech input before last and a user input expressing rejection of the speech recognition result before last is made, a further training operation or further adaptation of the speech recognition device takes place provided that the latest speech recognition result and the one before last represent the same word or the same word sequence.

13. A mobile terminal with a speech recognition device used to act upon functions of the mobile telephone terminal, in which the mobile telephone terminal and the speech recognition device are designed in such a way that the following steps are used for the training or adaptation of the speech recognition device:

performance of a speech input;

processing of the speech input by means of the speech recognition device (4);

production of a speech recognition result;

if the speech recognition result can be allocated to a function of the mobile telephone terminal, action upon the allocatable function of the mobile telephone terminal;

training or adaptation on the basis of the speech recognition result associated with the speech input made, if the action upon the allocatable function of the mobile telephone terminal does not cause a user input expressing rejection, characterized in that, if after a speech input a user input is made expressing the rejection of a speech recognition result and if, subsequently, a user input is made by means of another input method, it is provided that, taking into account the input made by means of the other input method, a reliability grade for the speech recognition result is determined and a training operation or adaptation of the speech recognition device performed, provided that the speech input and the user input made by means of the other input method represent the same word or word sequence.

14. A mobile terminal as claimed in claim 13, characterized in that the training or adaptation of the speech recognition device takes place if the performance of the function of the electrical appliance is not interrupted by a user input.

15. A mobile terminal as claimed in claim 13, characterized in that, for a speech recognition result of the speech recognition device, a reliability grade is determined, and that a training or adaptation of the speech recognition device is carried out on the basis of the speech recognition result corresponding to the speech input made if the reliability grade of the speech recognition result falls within a prescribed target range.

16. A mobile terminal as claimed in claim 13, characterized in that, for a speech recognition result of the speech recognition device, an initial reliability grade is determined, in that the training or adaptation of the speech recognition device is performed on the basis of the speech recognition result corresponding to the speech input made if the initial reliability grade of the speech recognition result falls within a prescribed initial target range, in that if the initial reliability grade does not fall within the initial target range and also if the subsequent user input is made by means of another input method, it is provided that, taking into account the input made by means of the other input method, a second reliability grade for the speech recognition result is determined and a training operation or adaptation is performed on the basis of the speech recognition result taking into account the user input made by means of the other input method if the second reliability grade falls within a second prescribed target range.

17. A mobile terminal as claimed in claim 13, characterized in that the speech recognition device also supplies in each case at least one speech recognition result alternative, in that the training or adaptation of the speech recognition device is carded out on the basis of the speech recognition result associated with the latest speech input, if the action upon the function of the electrical appliance allocatable to the speech recognition result does not cause a user input expressing rejection of the speech recognition result, and if the speech recognition result corresponds to a speech recognition result alternative to the speech input before last and a user input expressing rejection of the speech recognition result before last is made, a further training operation or further adaptation of the speech recognition device takes place provided that the latest speech recognition result and the one before last represent the same word or the same word sequence.

* * * * *